(12) United States Patent
Efrati et al.

(10) Patent No.: US 9,444,944 B2
(45) Date of Patent: Sep. 13, 2016

(54) SYSTEMS AND METHODS FOR CONNECTING TELEPHONY COMMUNICATIONS

(71) Applicant: VONAGE NETWORK, LLC, Holmdel, NJ (US)

(72) Inventors: Tzahi Efrati, Hoboken, NJ (US); Gavin Macomber, Far Hills, NJ (US); Anthony Russo, Jersey City, NJ (US)

(73) Assignee: VONAGE BUSINESS INC., Holmdel, NJ (US)

( * ) Notice: Subject to any disclaimer, the term of this patent is extended or adjusted under 35 U.S.C. 154(b) by 0 days.

(21) Appl. No.: 14/822,629

(22) Filed: Aug. 10, 2015

(65) Prior Publication Data

US 2015/0350449 A1 Dec. 3, 2015

Related U.S. Application Data

(63) Continuation of application No. 13/730,260, filed on Dec. 28, 2012, now Pat. No. 9,106,673.

(51) Int. Cl.
*H04L 29/06* (2006.01)
*H04M 3/56* (2006.01)
*H04M 3/48* (2006.01)

(52) U.S. Cl.
CPC ............ *H04M 3/56* (2013.01); *H04L 65/1069* (2013.01); *H04L 65/1096* (2013.01); *H04L 65/80* (2013.01); *H04M 3/48* (2013.01)

(58) Field of Classification Search
CPC .... H04M 3/56; H04L 65/1069; H04L 65/80; H04L 65/1096
See application file for complete search history.

(56) References Cited

U.S. PATENT DOCUMENTS

| 6,779,020 | B1 | 8/2004 | Henrick |
| 6,889,321 | B1 | 5/2005 | Kung et al. |
| 7,068,646 | B2 | 6/2006 | Fangman et al. |
| 7,933,397 | B2 | 4/2011 | Jain |
| 7,995,730 | B1* | 8/2011 | Zhang ............... H04M 3/42059 379/142.09 |
| 8,265,083 | B1 | 9/2012 | Cannon et al. |
| 8,271,660 | B2 | 9/2012 | Schulzrinne et al. |
| 8,401,545 | B2 | 3/2013 | Tal et al. |
| 2003/0185360 | A1 | 10/2003 | Moore et al. |
| 2006/0013371 | A1 | 1/2006 | Akizuki et al. |
| 2007/0121831 | A1 | 5/2007 | Kim et al. |
| 2008/0089509 | A1 | 4/2008 | Wuthnow et al. |
| 2008/0137598 | A1 | 6/2008 | Bouvier et al. |
| 2009/0232130 | A1 | 9/2009 | Philavong |
| 2009/0279451 | A1 | 11/2009 | Toyokawa et al. |

(Continued)

OTHER PUBLICATIONS

Apr. 15, 2014 International Search Report issued for Application No. PCT/US2013/077643.

(Continued)

*Primary Examiner* — Jay P Patel
(74) *Attorney, Agent, or Firm* — Nixon & Vanderhye P.C.; Joseph Pagnotta (57) ABSTRACT

Systems and methods performed by an IP telephony system are designed to determine when two parties to a recently terminated telephony communication are simultaneously calling each other in an attempt to re-establish a telephony communication. When the IP telephony system determines that this situation is occurring, the IP telephony system acts to connect the two parties, rather than have both of them see their new call setup attempt fail because the other party's telephony device is indicated to be busy.

8 Claims, 5 Drawing Sheets

(56) References Cited

U.S. PATENT DOCUMENTS

| | | |
|---|---|---|
| 2010/0002684 A1 | 1/2010 | Chun |
| 2010/0220845 A1 | 9/2010 | Oliver et al. |
| 2011/0044306 A1* | 2/2011 | Liang .................. H04L 12/4641 370/338 |
| 2011/0230184 A1 | 9/2011 | Tal et al. |

OTHER PUBLICATIONS

Apr. 15, 2014 Written Opinion issued for Application No. PCT/US2013/077643.

Oct. 13, 2015 Extended European Search Report issued in European Application No. 13868844.5.

* cited by examiner

SYSTEMS AND METHODS FOR CONNECTING TELEPHONY COMMUNICATIONS

CROSS-REFERENCE TO RELATED APPLICATIONS

This application is a continuation of U.S. patent application Ser. No. 13/730,260, which was filed Dec. 28, 2012, the entire contents of which is hereby incorporated by reference.

BACKGROUND OF THE INVENTION

The invention is related to Internet Protocol (IP) telephony systems. More specifically, the invention is related to systems and methods for connecting two people who are attempting to call each other at substantially the same time.

When two people are attempting to call each other simultaneously, it is common for one or both parties to receive a busy signal, indicating that the other party's telephony device is engaged in another call. As a result, the call attempt fails.

One common situation where two parties end up trying to call each other at the same time occurs when the two parties are conducting a telephone call, and the call is prematurely disconnected. When that occurs, often each party will attempt to call the other party. And because one or both parties receive a busy signal, it becomes difficult and frustrating for the parties to re-connect.

An ongoing telephone call can be prematurely disconnected for any of many different reasons. One party may accidentally terminate the call. The telephony systems which are providing the service for the call may malfunction, resulting in premature termination of the call. Also, if one or both parties is using a cellular telephone to conduct the call, a party using a cellular telephone may travel out of range of a cell tower, and the call may be terminated. The same sort of thing may happen if one of the parties is utilizing a wireless access point connection to a data network to conduct the call, and the party's telephony device moves out of range of the wireless access point.

There is a need for systems and methods which can identify when two parties are attempting to call each other at the same time, and which can assist in connecting the parties.

DETAILED DESCRIPTION OF PREFERRED EMBODIMENTS

The following detailed description of preferred embodiments refers to the accompanying drawings, which illustrate specific embodiments of the invention. Other embodiments having different structures and operations do not depart from the scope of the present invention.

In the following description, the terms VOIP system, VOIP telephony system, IP system and IP telephony system are all intended to refer to a system that connects callers and that delivers data, text or video communications using Internet protocol data communications.

Figure 1:
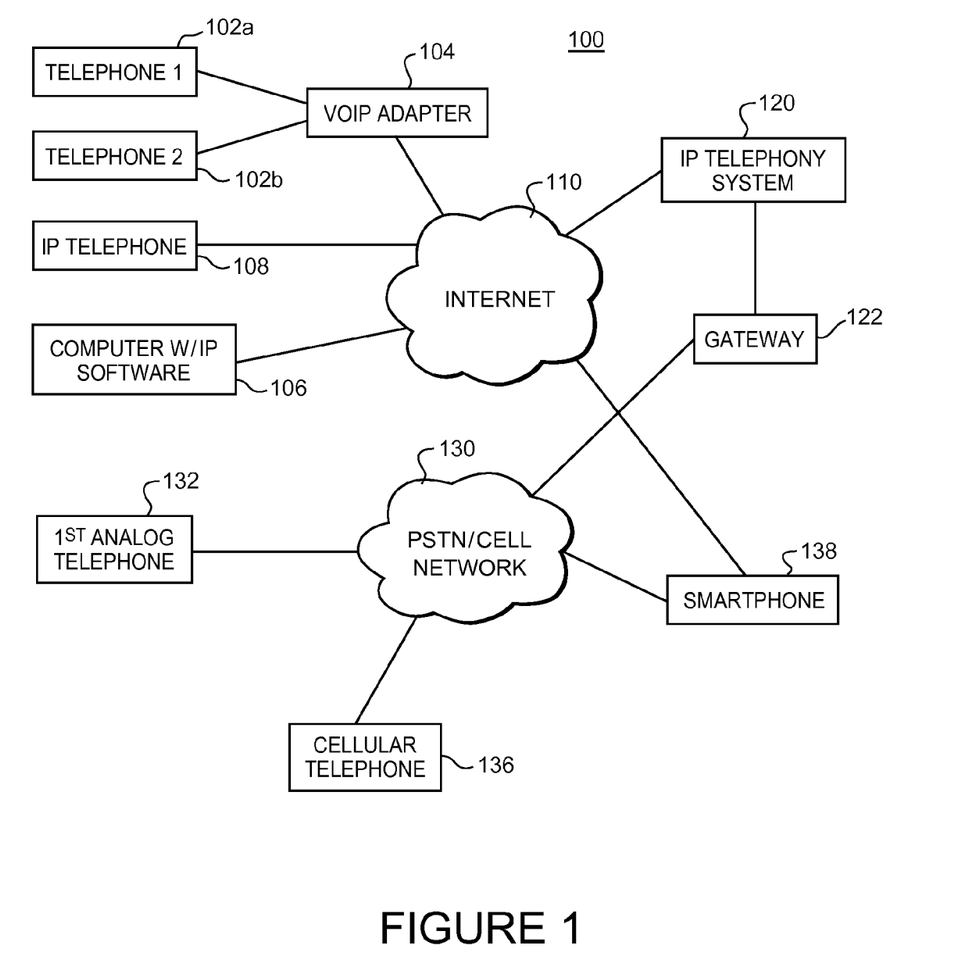
FIG. 1 is a diagram of a communications environment including various elements which are associated with an Internet protocol (IP) telephony system.

As illustrated in FIG. 1, a communications environment 100 is provided to facilitate IP based communications. An IP telephony system 120 enables connection of telephone calls between its own customers and other parties via data communications that pass over a data network. The data network is commonly the Internet 110, however, private data networks may form all or a portion of the data communication path. The IP telephony system 120 is connected to the Internet 110. In addition, the IP telephony system 120 is connected to both a publicly switched telephone network (PSTN) 130 via one or more gateways 122.

The gateway 122 allows users and devices that are connected to the PSTN 130 to connect with users and devices that are reachable through the first IP telephony system 120, and vice versa. In some instances, the gateway 122 would be a part of the first IP telephony system 120. In other instances, the gateway 122 could be maintained by a third party.

Customers of the first IP telephony system 120 can place and receive telephone calls using an IP telephone 108 that is connected to the Internet 110. Such an IP telephone 108 could be connected to an Internet service provider via a wired connection or via a wireless router. In some instances, the IP telephone 108 could utilize a cellular telephone system to access the Internet 110.

Alternatively, a customer could utilize a normal analog telephone 102a which is connected to the Internet 110 via a telephone adapter 104. The telephone adapter 104 converts analog signals from the telephone 102a into data signals that pass over the Internet 110, and vice versa. Also, as illustrated in FIG. 1, multiple analog telephone devices 102a and 102b could all be coupled to the same telephone adaptor 104. Analog telephone devices include, but are not limited to, standard telephones and document imaging devices such as facsimile machines. A configuration using a telephone adapter 104 is common where all of the analog telephones 102a, 102b are located in a residence or business, and all of the telephone devices are connected to the same telephone adapter. With this configuration, all of the analog telephone devices 102a, 102b share the same telephone number assigned to the telephone adaptor 104. Other configurations are also possible where multiple communication lines (e.g., a second telephone number) are provisioned by the IP telephony system 120.

In addition, a customer could utilize a soft-phone client running on a computer 106 to place and receive IP based telephone calls, and to access other IP telephony systems (not shown). In some instances, the soft-phone client could be assigned its own telephone number. In other instances, the soft-phone client could be associated with a telephone number that is also assigned to an IP telephone 108, or to a telephone adaptor 104 that is connected to one or more analog telephones 102.

A third party using an analog telephone 132 which is connected to the PSTN 130 may call a customer of the IP telephony system 120. In this instance, the call is initially connected from the analog telephone 132 to the PSTN 130, and then from the PSTN 130, through the gateway 122 to the IP telephony system 120. The IP telephony system 120 then routes the call to the customer's IP telephony device. A third party using a cellular telephone 136 could also place a call to an IP telephony system 120 customer, and the connection would be established in a similar manner, although the first link would involve communications between the cellular telephone 136 and a cellular telephone network. For purposes of this explanation, the cellular telephone network is considered part of the first PSTN 130.

In addition, mobile computing devices which include cellular telephone capabilities could also be used to place telephone calls to customers of the IP telephony system 120. A smartphone 138 having both cellular telephone capabilities and the ability to run a software IP telephony client could place a call through a cellular network 130, or via the IP telephony system 120. The smartphone 138 may connect to the IP telephony system 120 via a wireless data connection passing through the cellular network 130, or via a wireless connection to the Internet 110 provided by a wireless access point. Of course, alternate embodiments could utilize any other form of wired or wireless communications path to enable communications.

Users of the IP telephony system 120 are able to access the service from virtually any location where they can connect to the Internet 110. Thus, a customer could register with an IP telephony system provider in the U.S., and that customer could then use an IP telephone 108 located in a country outside the U.S. to access the services. Likewise, the customer could also utilize a computer outside the U.S. that is running a soft-phone client to access the first IP telephony system 120. Further, in some instances a user could place a telephone call with the analog telephone 132 or the cellular telephone 136 that is routed through the PSTN 130 to the IP telephony system 120 via the gateway 122. This would typically be accomplished by the user calling a local telephone number that is routed to the IP telephony system 120 via the gateway 122. Once connected to the IP telephony system 120, the user may then place an outgoing long distance call to anywhere in the world using the IP telephony system's network. Thus, the user is able place a long distance call using lower cost IP telephony service provided by the IP telephony system 120, rather than a higher cost service provided by the PSTN 130.

Figure 2:
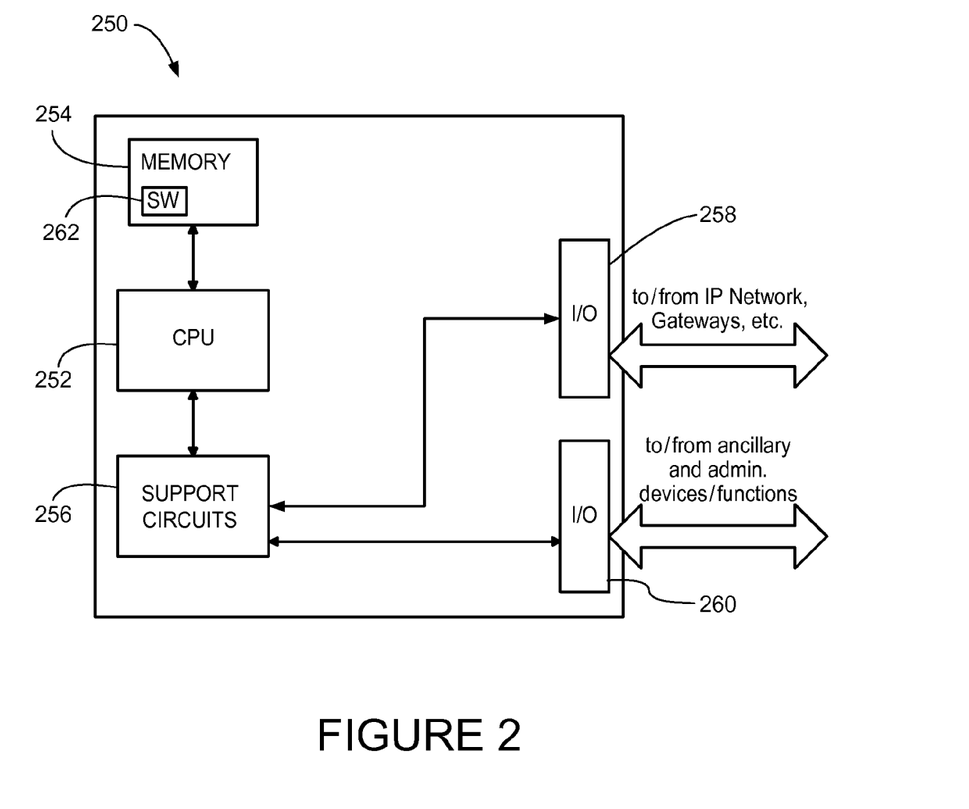
FIG. 2 is a diagram of various elements of a processor that forms part of an IP telephony system or an IP telephony device.

FIG. 2 illustrates elements of a computer processor 250 that can be used as part of the IP telephony system 120 to accomplish various functions. The IP telephony system 120 could include multiple processors 250 located at various locations in the system, along with their operating components and programming, each carrying out a specific or dedicated portion of the functions performed by the IP telephony system 120.

The processor 250 shown in FIG. 2 may be one of any form of a general purpose computer processor used in accessing an IP-based network, such as a corporate intranet, the Internet or the like. The processor 250 comprises a central processing unit (CPU) 252, a memory 254, and support circuits 256 for the CPU 252. The processor 250 also includes provisions 258/260 for connecting the processor 250 to customer equipment, to service provider equipment, to and IP network or gateways, as well as possibly one or more input/output devices (not shown) for accessing the processor and/or performing ancillary or administrative functions related thereto. The provisions 258/260 are shown as separate bus structures in FIG. 2; however, they may alternately be a single bus structure without degrading or otherwise changing the intended operability of the processor 250.

The memory 254 is coupled to the CPU 252. The memory 254, or computer-readable medium, may be one or more of readily available memory such as random access memory (RAM), read only memory (ROM), floppy disk, hard disk, flash memory or any other form of digital storage, local or remote, and is preferably of non-volatile nature. The support circuits 256 are coupled to the CPU 252 for supporting the processor in a conventional manner. These circuits include cache, power supplies, clock circuits, input/output circuitry and subsystems, and the like.

A software routine 262, when executed by the CPU 252, causes the processor 250 to perform processes of the disclosed embodiments, and is generally stored in the memory 254. The software routine 262 may also be stored and/or executed by a second CPU (not shown) that is remotely located from the hardware being controlled by the CPU 252. Also, the software routines could also be stored remotely from the CPU. For example, the software could be resident on servers and memory devices that are located remotely from the CPU, but which are accessible to the CPU via a data network connection.

The software routine 262, when executed by the CPU 252, transforms the general purpose computer into a specific purpose computer that performs one or more functions of the IP telephony system 120. Although the processes of the disclosed embodiments may be discussed as being implemented as a software routine, some of the method steps that are disclosed therein may be performed in hardware as well as by a processor running software. As such, the embodiments may be implemented in software as executed upon a computer system, in hardware as an application specific integrated circuit or other type of hardware implementation, or a combination of software and hardware. The software routine 262 of the disclosed embodiments is capable of being executed on any computer operating system, and is capable of being performed using any CPU architecture.

In the following description, references will be made to an "IP telephony device." This term is used to refer to any type of device which is capable of interacting with an IP telephony system to complete a telephone call. An IP telephony device could be an IP telephone, a computer running IP telephony software, a telephone adapter which is connected to an analog telephone, or some other type of device capable of communicating via data packets. An IP telephony device could also be a cellular telephone or a portable or tablet computing device that runs a software client that enables the device to act as an IP telephone. Thus, a single device might be capable of operating as both a cellular telephone and an IP telephony device.

Moreover, certain devices that are not traditionally used as telephony devices may act as telephony devices once they are configured with appropriate client software. Thus, some devices that would not normally be considered telephony devices may become telephony devices or IP telephony devices once they are running appropriate software. One example would be a desktop or a laptop computer that is running software that can interact with an IP telephony system over a data network to conduct telephone calls. Another example would be a portable computing device, such as an Apple iPod Touch™, which includes a speaker and a microphone. A software application loaded onto an Apple iPod Touch™ can be run so that the Apple iPod Touch™ can interact with an IP telephony system to conduct a telephone call.

The following description will also refer to telephony communications and telephony activity. These terms are intended to encompass all types of telephone communications, regardless of whether all or a portion of the communications are carried in an analog or digital format. Telephony communications could include audio or video telephone calls, facsimile transmissions, text messages, SMS messages, MMS messages, video messages, and all other types of telephony and data communications sent by or received by a user. These terms are also intended to encompass data communications that are conveyed through a PSTN or VOIP telephony system. In other words, these terms are intended to encompass any communications whatsoever, in any format, which traverse all or a portion of a communications network or telephony network.

In the following description, references are made to reconnecting two parties to an audio or video call which has been recently terminated. Although the term "call" is used in this description, the systems and methods described below could also be used to reconnect two parties to other forms of telephony communications that were recently terminated. Thus, the references to a "call" are in no way to be considered limiting.

Figure 3:
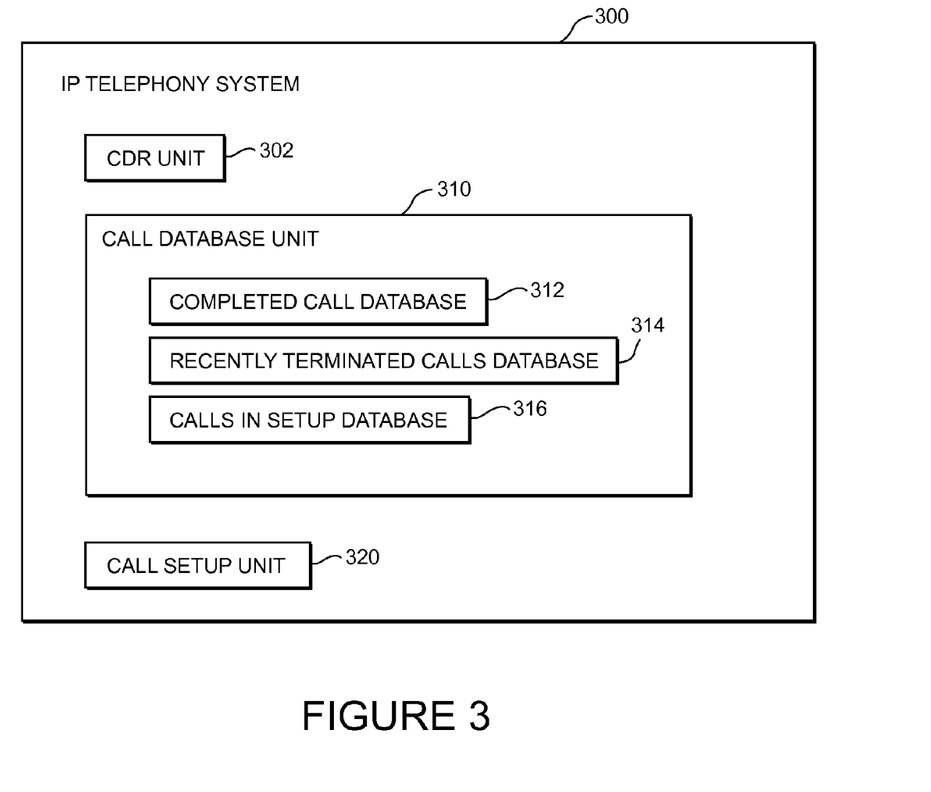
FIG. 3 is block diagram illustrating various elements of an IP telephony system embodying the present technology.

FIG. 3 illustrates some elements which may be present in an IP telephony system 300. As shown therein, the IP telephony system 300 includes a CDR unit 302 which stores call detail records (CDRs) that have been created for calls that were handled by the IP telephony system. Various items of information are available in each CDR, including the identity of the parties to the call.

The IP telephony system 300 also includes a call database unit 310. The call database unit 310 includes several call databases including a completed call database 312, a database containing information on recently terminated calls 314 and a database that lists calls which are in the setup stage 316. The calls listed as being in the setup stage can include both outgoing calls and incoming calls that are being setup by the IP telephony system 300.

The IP telephony system 300 also includes a call setup unit 320, which is responsible for setting up both outgoing calls being placed by customers of the IP telephony system as well as incoming calls that are directed to customers of the IP telephony system. As will be explained below, the call setup unit 320 is configured to determine when two parties to a recently terminated telephony communication are simultaneously attempting to call each other to re-establish a telephony communication. Typically, this results in both parties receiving an indication that the other party's telephony device is busy, which prevents the parties from quickly and easily re-establishing a telephony communication. However, when the call setup unit 320 determines that this situation is occurring, the call setup unit 320 acts to connect the two parties.

Figure 4:
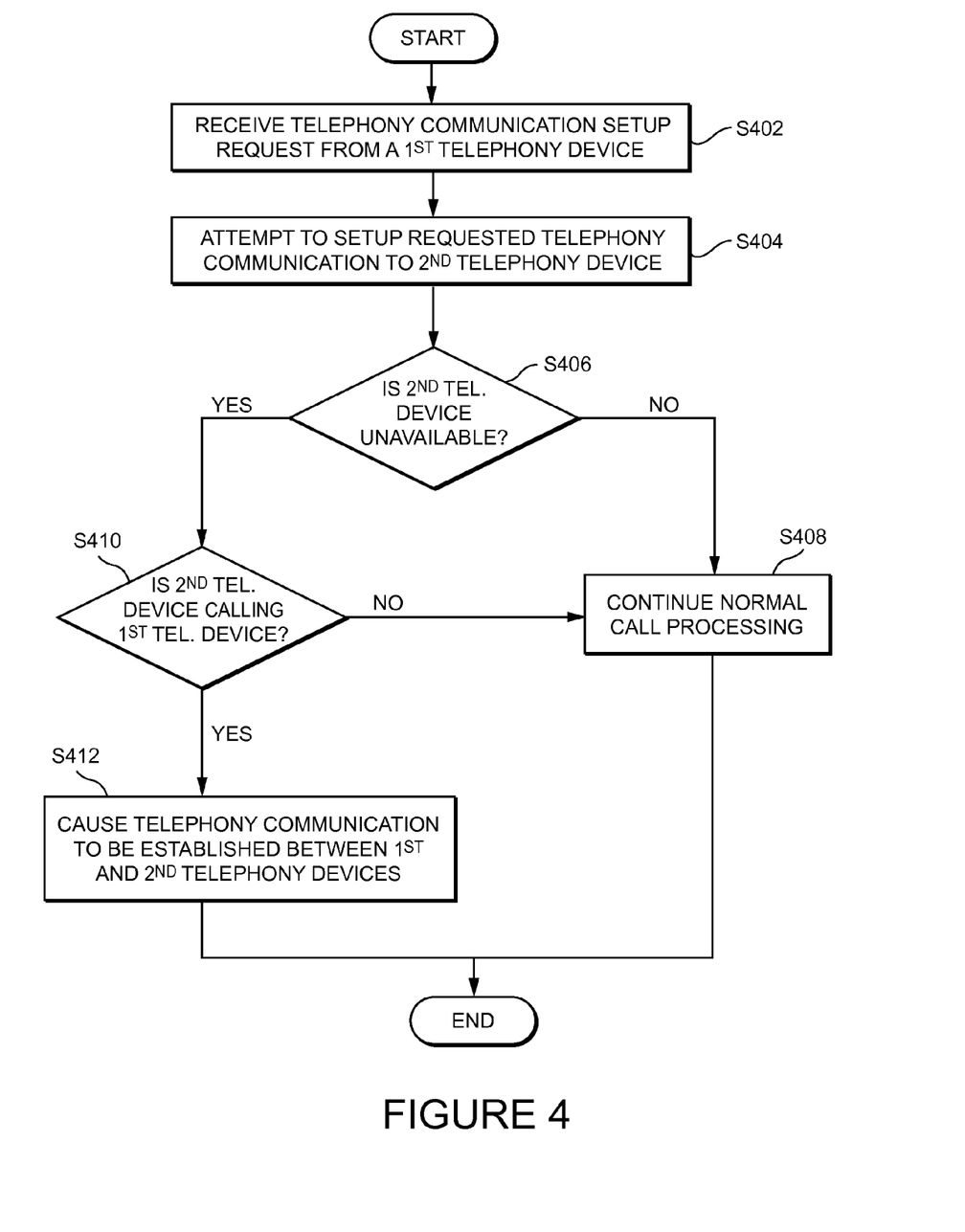
FIG. 4 is a flowchart illustrating steps of a first method embodying the present technology for reconnecting two parties to a recently terminated communication.

FIG. 4 illustrates steps of a first method that would be performed by elements of an IP telephony system 300 to connect two parties who are attempting to call each other at the same time. As noted above, this could occur when the parties were conducting a call that was prematurely terminated. The method begins and proceeds to step S402, wherein the call setup unit 320 of an IP telephony system 300 receives a call setup request from a first telephony device. The first telephony device could be one used by a customer of the IP telephony system 300, which would mean that this is an outgoing call setup request. The call setup request could be directed to a second telephony device that is used by another customer of the IP telephony system 300, or a second telephony device that is reachable only via a separate telephony system, such as a PSTN or a cellular telephony service provider. The call setup request received in step S402 could also be an incoming call setup request received from a different telephony system, such as a PSTN or a cellular telephony service provider, where the call setup request seeks to establish a telephony communication with a second telephony device which is used by a customer of the IP telephony system 300.

In step S404, the call setup unit attempts to setup the requested telephony communication to the second telephony device identified in the setup request. In step S406, a check is performed to determine if the second telephony device is indicated to be busy or unavailable. If not, the method proceeds to step S408, and call processing proceeds according to normal procedures.

On the other hand, if the check performed in step S406 indicates that the second telephony device is unavailable or busy, the method proceeds to step S410, where a check is performed to determine if the second telephony device is presently attempting to setup a telephony communication to the first telephony device. This check could be performed by querying a database of calls that are in the setup state 316 which is maintained by the IP telephony system 300. Of course, the check could also be performed in other ways, as will be appreciated by those of ordinary skill in the art.

If the check performed in step S410 indicates that the second telephony device is not simultaneously attempting to setup a telephony communication to the first telephony device, the method proceeds to step S408, and call processing proceeds normally. However, if the check performed in step S410 indicates that the second telephony device is simultaneously trying to setup a telephony communication to the first telephony device, the method proceeds to step S412, wherein the call setup unit 320 acts to cause the first and second telephony devices to be connected to one another.

The action performed in step S412 could include various different steps. For example, in one embodiment, the call setup unit 320 could cause the call setup attempt being performed on behalf of the second telephony device to be canceled. This would free up the second telephony device so that it can receive and respond to the call setup attempt being made by the first telephony device. Conversely, the call setup unit 320 could cause the call setup attempt being made by the first telephony to be canceled, which would free up the first telephony device to receive and respond to the call setup attempt being made by the second telephony device.

The determination about which setup attempt to cancel could depend upon which of the telephony devices is one which is used by a customer of the IP telephony system. For example, if the call setup attempt received in step S402 is an outgoing call setup attempt being placed by a customer of the IP telephony system 300, it will likely be easier to quickly cancel that call setup attempt. If the call setup attempt received in step S402 is an incoming call setup attempt received from a customer of some other telephony service provider, it will likely be easier to quickly cancel the setup attempt being made by the second telephony device.

In still other embodiments, it may not be necessary to cancel either call setup attempt. Instead, the call setup unit 320 may be capable of establishing a telephony communication between the first and second telephony devices by manipulating the setup signaling that is occurring.

Figure 5:
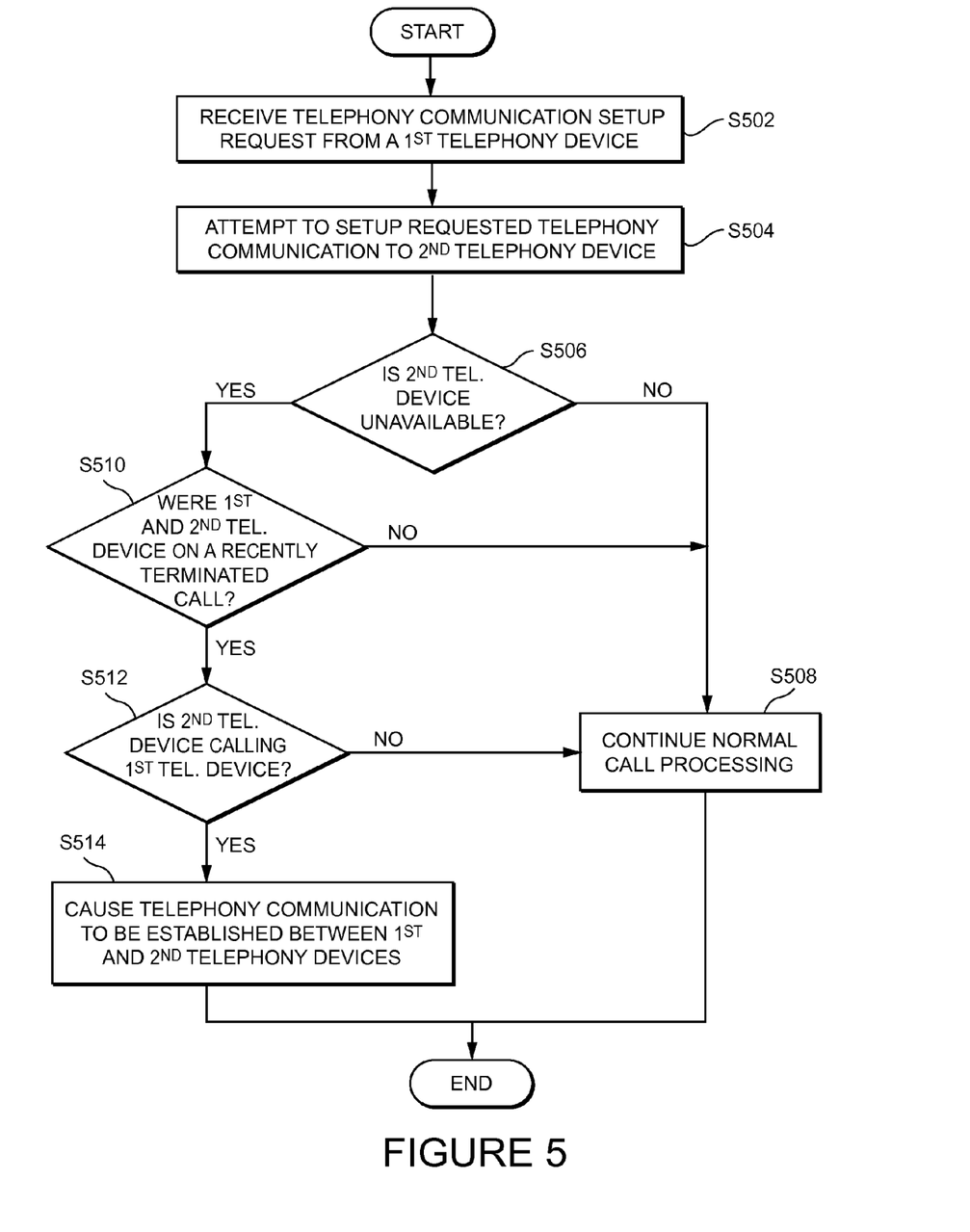
FIG. 5 is a flowchart illustrating steps of a second method embodying the present technology for reconnecting two parties to a recently terminated telephony communication.

FIG. 5 illustrates steps of an alternate method of connecting two parties that are trying to call each other at the same time. This method is particularly well suited to re-connecting two parties to a recently terminated telephony communication. The method begins and proceeds to step S502, wherein the call setup unit 320 of an IP telephony system 300 receives a call setup request from a first telephony device. Here again, the first telephony device could be one used by a customer of the IP telephony system 300, which would mean that this is an outgoing call setup request. The call setup request could also be directed to a second telephony device that is used by another customer of the IP telephony system 300, or a second telephony device that is reachable only via a separate telephony system, such as a PSTN or a cellular telephony service provider. The call setup request received in step S502 could also be an incoming call setup request received from a different telephony system, such as a PSTN or a cellular telephony service provider, where the call setup request seeks to establish a telephony communication with a second telephony device which is used by a customer of the IP telephony system 300.

In step S504, the call setup unit 320 attempts to setup the requested telephony communication to the second telephony device identified in the setup request. In step S506, a check is performed to determine if the second telephony device is indicated to be busy or unavailable. If not, the method proceeds to step S508, and call processing proceeds according to normal procedures.

On the other hand, if the check performed in step S506 indicates that the second telephony device is unavailable or busy, the method proceeds to step S510, where a check is performed to determine if the first and second telephony devices were parties to a recently terminated telephony communication. Again, this determination is intended to identify a situation where two parties are both trying to call each other at the same time, and both parties are receiving a busy signal.

The check performed in step S510 could be accomplished by consulting a completed call database 312 that is maintained by the IP telephony system 300. The completed call database 312 lists all completed calls for a relevant time period, and it is possible to query the database based on the telephone numbers or identity of the first and second telephony devices. Thus, a query can be performed to determine if the first and second telephony devices were parties to a recently terminated telephony communication.

To facilitate the check performed in step S510, the IP telephony system may maintain a separate database of recently terminated telephony communications 314. This database would list only telephony communications that very recently terminated. For example, the recently terminated calls database 314 may only list telephony communications which terminated over the last five minutes. Of course, some other relevant time frame could also be selected. This type of a database would likely be much smaller that the completed call database 312, which would make is faster and easier to search. In addition, the information contained in the recently terminated calls database could be limited to a small subset of the information contained in the completed calls database 312. For example, the recently completed calls database 314 could only list the termination time, and the telephone numbers or identity of the first and second telephony devices which were parties to each communication. Here again, the small size of the recently completed calls database 314 would ensure that queries can be rapidly completed.

The point of performing the check made in step S510 is to potentially eliminate the resources and time required to check in a database of all calls that are in the setup state to verify that a first telephony device is trying to setup a call with a second telephony device at the same time the second telephony device is trying to setup a call to the first telephony device. The check performed in step S510 can be performed using a small database that is easy and quick to search.

The check performed in step S510 could also be performed using information in a CDR unit 302 of the IP telephony system. The information in the CDRs may also make it possible for the call setup unit 320 to determine if the first and second telephony devices were parties to a recently terminated telephony communication.

If the check performed in step S510 indicates that the first and second telephony devices were not parties to a recently terminated call, then call setup proceeds normally in step S508. However, if the check indicates that the first and second telephony devices were parties to a recently terminated call, then in step S512 a check is performed by querying a database of calls that are in the setup state 316 to determine if the first and second telephony devices are simultaneously attempting to contact each other.

If the check performed in step S512 indicates that the first and second telephony devices are not simultaneously attempting to contact each other, the method proceeds to step S508, and call processing proceeds normally. However, if the check performed in step S512 indicates that the first and second telephony devices are simultaneously attempting to contact each other, the method proceeds to step S514, wherein the call setup unit 320 acts to cause the first and second telephony devices to be connected to one another. The techniques used in step S514 would be essentially the same as those used in step S412 of the method discussed above in connection with FIG. 4.

In yet other alternative embodiments, the check performed in step S510 might be performed by querying a call log on the first and second telephony devices themselves to determine if the first and second telephony devices were parties to a recently terminated call.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method performed by a first telephony device to setup a telephony communication with a second telephony device, comprising:
   sending, from the first telephony device, an outgoing telephony communication setup request to a telephony system, where the outgoing setup request asks for the setup of a telephony communication with the second telephony device;
   receiving, subsequent to performing the sending step, an instruction from the telephony system to cancel the outgoing setup request;

checking to determine if the first and second telephony devices were engaged in a telephony communication that was recently terminated, canceling the outgoing setup request in response to receipt of the cancellation instruction from the telephony system only when it is determined that the first and second telephony devices were engaged in a telephony communication that was recently terminated;

receiving, from the telephony system, an incoming telephony communication setup request to establish a telephony communication with the second telephony device; and setting up the telephony communication with the second telephony device in response to receipt of the incoming telephony communication setup request.

2. The method of claim 1, wherein the instruction to cancel the outgoing setup request is received because the telephony system determined that the first telephony device was attempting to setup a telephony communication with the second telephony device at substantially the same time that the second telephony device was attempting to setup a telephony communication with the first telephony device.

3. The method of claim 1, wherein the checking step is performed by consulting a call log maintained by the first telephony device.

4. A non-transitory computer readable medium that stores instructions which, when performed by one or more processors of a telephony device, cause the telephony device to perform a method comprising:

sending an outgoing telephony communication setup request to a telephony system, where the outgoing setup request asks for the setup of a telephony communication with the second telephony device;

receiving, subsequent to performing the sending step, an instruction from the telephony system to cancel the outgoing setup request;

checking to determine if the first and second telephony devices were engaged in a telephony communication that was recently terminated, canceling the outgoing setup request in response to receipt of the cancellation instruction from the telephony system only when it is determined that the first and second telephony devices were engaged in a telephony communication that was recently terminated;

receiving, from the telephony system, an incoming telephony communication setup request to establish a telephony communication with the second telephony device; and setting up the telephony communication with the second telephony device in response to receipt of the incoming telephony communication setup request.

5. The non-transitory computer readable medium of claim 4, wherein the instruction to cancel the outgoing setup request is received because the telephony system determined that the first telephony device was attempting to setup a telephony communication with the second telephony device at substantially the same time that the second telephony device was attempting to setup a telephony communication with the first telephony device.

6. The non-transitory computer readable medium of claim 4, wherein the checking step is performed by consulting a call log maintained by the first telephony device.

7. A method performed by a second telephony device for establishing a telephony communication between the second telephony device and a first telephony device comprising:

receiving, at the second telephony device, a first incoming telephony communication setup request from the first telephony device via an Internet Protocol (IP) telephony system while attempting to setup an outgoing telephony communication to the first telephony device identified in the first setup request;

checking to determine if the first and second telephony devices were engaged in a telephony communication that was recently terminated;

cancelling the outgoing telephony communication setup attempt directed toward the first telephony device when it is determined that the first and second telephony devices were engaged in a telephony communication that was recently terminated; and responding to the incoming telephony communication setup request by setting up a telephony communication with the first telephony device.

8. A non-transitory computer readable medium that stores instructions which, when performed by one or more processor of a telephony device, cause the telephony device to perform a method comprising:

receiving, at the second telephony device, a first incoming telephony communication setup request from the first telephony device via an Internet Protocol (IP) telephony system while attempting to setup an outgoing telephony communication to the first telephony device identified in the first setup request;

checking to determine if the first and second telephony devices were engaged in a telephony communication that was recently terminated;

cancelling the outgoing telephony communication setup attempt directed toward the first telephony device when it is determined that the first and second telephony devices were engaged in a telephony communication that was recently terminated; and responding to the incoming telephony communication setup request by setting up a telephony communication with the first telephony device.

* * * * *